(12) United States Patent
Miyazawa et al.

(10) Patent No.: US 8,224,297 B2
(45) Date of Patent: *Jul. 17, 2012

(54) ADVERTISING INFORMATION PROVIDING METHOD AND ADVERTISING INFORMATION PROVIDING SYSTEM

(75) Inventors: Gen Miyazawa, Tokyo (JP); Shinji Kimura, Tokyo (JP); Hajime Hotta, Tokyo (JP)

(73) Assignee: Yahoo Japan Corporation, Tokyo (JP)

( * ) Notice: Subject to any disclaimer, the term of this patent is extended or adjusted under 35 U.S.C. 154(b) by 863 days.

This patent is subject to a terminal disclaimer.

(21) Appl. No.: 11/916,021

(22) PCT Filed: Jan. 10, 2006
(Under 37 CFR 1.47)

(86) PCT No.: PCT/JP2006/300129
§ 371 (c)(1),
(2), (4) Date: Jan. 7, 2009

(87) PCT Pub. No.: WO2006/129397
PCT Pub. Date: Dec. 7, 2006

(65) Prior Publication Data
US 2009/0247190 A1    Oct. 1, 2009

(30) Foreign Application Priority Data
Jun. 1, 2005  (JP) ................................ 2005-188923

(51) Int. Cl.
*H04M 3/42* (2006.01)

(52) U.S. Cl. ............... 455/414.1; 455/456.3; 455/456.1; 455/513; 455/550.1; 455/566; 705/14.4; 705/14.41; 705/14.49; 705/14.58; 705/14.57

(58) Field of Classification Search ............... 455/414.1, 455/456.3, 456.1, 513, 550.1, 566; 705/14.4, 705/14.41, 14.49, 14.58, 14.57, 14.68
See application file for complete search history.

(56) References Cited

U.S. PATENT DOCUMENTS
8,078,149 B2 * 12/2011 Miyazawa ................ 455/414.1
(Continued)

FOREIGN PATENT DOCUMENTS
JP        2001-306567        11/2001
(Continued)

*Primary Examiner* — Ajit Patel
*Assistant Examiner* — Khai M Nguyen
(74) *Attorney, Agent, or Firm* — Ditthavong Mori & Steiner, P.C.

(57) ABSTRACT

By using the location information of a wireless communication terminal, an advertising information display method, etc. is provided to display on a display, highly useful advertising information, that is, advertising information of an advertising information transmission source, which is located at a location that is close to the location at which the user of the wireless communication terminal is present. This advertising information display method, which displays, on a display 2*b* of a mobile telephone device 2 that is capable of transmitting terminal location information 2*b*, advertising information 3*a*, which is transmitted from a store 3, and is capable of transmitting store location information 3*p* and advertising information 3*a*, has: a step to obtain terminal location information 2*p* and the transmission time thereof tm, a step to obtain the store location information 3*p* and the advertising information 3*a*, a step to perform a ranking of the advertising information of the advertising information 3*a* based on time difference information T between the advertising information transmission time ta when the advertising information 3*a* is transmitted to the mobile telephone device 2, and the terminal location information transmission time tm, and location difference information L between the terminal location information 2*p* and the store location information 3*p*, a step to transmit the advertising information 3*a* by being associated with the ranking information H, to the mobile telephone device 2; and a step to display the advertising information 3*a* on the display 2*b* of the mobile telephone device 2, based on the ranking information H.

6 Claims, 7 Drawing Sheets

U.S. PATENT DOCUMENTS

| | | | |
|---|---|---|---|
| 2010/0222032 A1* | 9/2010 | Griffin et al. | 455/414.1 |
| 2010/0223133 A1* | 9/2010 | Scott et al. | 705/14.54 |
| 2011/0078022 A1* | 3/2011 | Desikan et al. | 705/14.54 |
| 2012/0089466 A1* | 4/2012 | Froloff | 705/14.71 |

FOREIGN PATENT DOCUMENTS

| | | | |
|---|---|---|---|
| JP | 2002-175465 | | 6/2002 |
| JP | 2002-236846 | | 8/2002 |
| JP | 2002236846 A | * | 8/2002 |
| JP | 2003-044552 | | 2/2003 |
| JP | 2003-233731 | | 8/2003 |
| JP | 2003-248776 | | 9/2003 |
| JP | 2004-54693 | | 2/2004 |
| JP | 2004-310524 | | 11/2004 |

* cited by examiner

Click advertising information 3a

ADVERTISING INFORMATION PROVIDING METHOD AND ADVERTISING INFORMATION PROVIDING SYSTEM

TECHNICAL FIELD

The present invention relates to an advertising information display method, an advertising information display system, an advertising information display program, and an advertising information ranking program, which displays advertising information from an advertising information transmission source on the display of a wireless communication terminal, and particularly relates to an advertising information display method that displays an advertiser's advertising information on a mobile telephone terminal, while performing a ranking of the advertising information by using location information and time information.

BACKGROUND ART

In recent years, wireless communication terminals for performing wireless communication have been prevalent. Particularly, mobile telephone terminals that are provided with the functions of a telephone device have been significantly prevalent, owing to the convenience of the ability to easily send/receive at all times/places, as well as to their increasingly sophisticated functionality, reasonable prices, and expansion of calling areas. Mobile telephone terminals that are provided with functions to send/receive various types of information, such as email and web browsing, have been entering the mainstream of recent mobile telephone terminals. As used herein, the word terminal means a terminal device.

Recently, a service to correctly measure the location of a mobile telephone terminal (or the user thereof) has been provided, by using a location measurement system such as a GPS. This can roughly determine the surrounding circumstances, even in cases where it is an unknown place and it is difficult to determine the surrounding circumstances, for example, by obtaining one's location using the mobile telephone terminal.

A service to provide surrounding region information and store information, etc., is also performed at that time, based on the location information of the mobile telephone terminal. For example, the surrounding circumstances and the store location information can be determined at a travel destination, etc., by using this service, which is very convenient. For example, even if something should become needed suddenly, one's own location information can be obtained and transmitted, and based on that, a store where the object that is needed can be purchased can be promptly found by receiving nearby store information. Examples of using the location information on a mobile telephone terminal include the descriptions of Patent Literature 1-3.

[Patent Literature 1]
Japanese Unexamined Patent Application Publication 2001-306567
[Patent Literature 2]
Japanese Unexamined Patent Application Publication 2003-044552
[Patent Literature 3]
Japanese Unexamined Patent Application Publication 2004-310524

DISCLOSURE OF THE INVENTION

Problem to be Solved by the Invention

However, in the existing technology, only the surrounding region information within the prescribed range and the store information existing in the prescribed range are provided. Thus, for example, there is the problem that a user may not feel like going all the way to the store if the location of the store is far away from the location where the user is located, even if the store advertisement is displayed on the display of the mobile telephone terminal.

Additionally, if time has passed since the location information was obtained from the mobile telephone terminal, in some cases, the user may have been far away from the location corresponding to the location information that was obtained. In this case, there is the problem that the advertising information cannot be effectively used, because the user has already been away from the location even though the store providing the displayed advertisement is close to the location corresponding to the location information of the mobile telephone terminal.

As described above, even when the nearby store advertising information is provided by using the location information of the mobile telephone terminal, if the user cannot use it effectively, it is not only inconvenient for the user, but also, it is impossible for the store providing the advertisement to obtain advertising effectiveness.

The present invention is developed in consideration of the above circumstances, and it is an illustrative challenge to provide an advertising information display method, advertising information display system, advertising information display program, and advertising information ranking program, which displays, on its display, highly useful advertising information, that is, advertising information from an advertising information transmission source (in general, a store) located at a location close to the location where the user of a mobile telephone terminal is located, by using the location information of a wireless communication terminal represented by a mobile telephone terminal.

Solution to the Problem

To solve the above problem, an advertising information display method according to an aspect of the present invention, which displays, on the display of a wireless communication terminal that is capable of transmitting terminal location information, advertising information, which is transmitted from an advertising information transmission source that is capable of transmitting transmission source location information and advertising information, is characterized by having a step to obtain the terminal location information and the transmission time of that terminal location information, a step to obtain the transmission source location information and the advertising information, a step to perform a ranking of the advertising information based on time difference information between the advertising information transmission time when the advertising information is transmitted to the wireless communication terminal, and the terminal location information transmission time, and location difference information between the terminal location information and the transmission source location information, a step to associate the advertising information with the ranking information and to transmit the associated advertising information to the wireless communication terminal, and a step to display the advertising information on the display of the wireless communication terminal, based on the ranking information.

In the case where a plurality of the advertising information transmission sources are located near the location corresponding to the location information of the wireless communication terminal (terminal location information), a ranking is performed for each item of advertising information transmitted by this advertising information transmission sources, and the advertising information is displayed on the display of the wireless communication terminal based on that ranking.

More particularly, the ranking of the advertising information is performed based on the location difference information (i.e. distance information) between the terminal location information and the location information of the advertising information transmission source (transmission source location information), and the time difference information (i.e. time information) between the time when a server, etc. transmits the advertising information to the wireless communication terminal (advertising information transmission time) and the time when the wireless communication terminal has transmitted the terminal location information (terminal location information transmission time). Accordingly, advertising information that is more effectively used by the wireless communication terminal user can be displayed preferentially. If the wireless communication terminal is a mobile telephone terminal, such high advertising effectiveness can be obtained in mobile telephones, which have a high prevalence rate.

The above advertising information display method may further have at least one of: a step to determine the order of displaying the advertising information on the display of the wireless communication terminal based on ranking information, a step to determine the frequency of displaying the advertising information on the display of the wireless communication terminal based on ranking information, a step to change the level of preferential treatment in the advertising information transmission source that transmits the advertising information based on ranking information, or a step to adjust the charging of the advertising fees to the advertising information transmission source that transmits the advertising information based on ranking information.

By determining the order and frequency of displaying the advertising information on the display, based on the ranking information, highly useful information to the user can be displayed in the order of high priority (for example, on the top or frequently). Therefore, it is convenient to the wireless communication terminal user, and it is possible for the advertising information transmission source to obtain high advertising effectiveness.

Also, high advertising effectiveness can be obtained by changing the level of preferential treatment within the advertising information transmission source based on the ranking information. As used herein, the level of preferential treatment in the advertising information transmission source is, for example, the discount rate of a coupon available in a store as an advertising information source. In cases where the advertising information having higher effectiveness for the wireless communication terminal user could be provided (in other words, a high rank value could be obtained), the advertising information transmission source can obtain the synergistic effects of the advertising information by setting a high discount rate for the coupon, and thus increase high advertising effectiveness. On the contrary, if only advertising information having low effectiveness could be provided (in other words, only a small rank value could be obtained), it would be possible to compensate for the advertising effectiveness by setting a high discount rate for the coupon.

The advertising fees can be automatically charged to a plurality of the advertising information transmission sources according to the advertising effectiveness by adjusting the charging of the advertising fees based on the ranking information. For example, in the case where the advertising information having high effectiveness has been able to be provided, the charging of the advertising fees are high, so if the charging of the advertising fees are set to be low in the case where advertising information having only low effectiveness has been provided, an equitable and balanced charging of the advertising fees can be automatically performed.

In a ranking step, when the time difference based on the time difference information between the advertising information transmission time and the terminal location information transmission time, is represented as T, and the distance based on the location difference information between the terminal location information and transmission source location information, is represented as L, it is preferable that the order of the advertisement information where the ranking information H represented by $H = k \times T \times L$ (in this case, k is a coefficient) is low, is to be placed at a higher priority than the ranking of the advertising information where the ranking information H is high.

Accordingly, when the time difference T is small and the distance L is also small, the priority of the advertising information can be high. Even if the wireless communication terminal user is moving, if the advertising information transmission time is close to the terminal location information transmission time (in other words, the time difference is small), it can be judged that the location where the user is located at the advertising information transmission time is not very far from the location corresponding to the terminal location information. Thus, the advertising information can be treated as a high priority, because the advertising information transmitted at the advertising information transmission time can be judged to be highly useful.

Meanwhile, the closer the location where the terminal user is located is to the location of the advertising information transmission source (in other words, the smaller the distance L is), the higher the priority with which the advertising information is to be treated, because the advertising information of the advertising information transmission source can be judged to be more highly useful. In other words, when the ranking information H, calculated based on the multiplication of the time difference T and the distance L, is lower, the advertising information can be considered to be more highly useful, and such advertising information can be placed at a high priority.

The ranking information H may be also calculated based on the addition of the time difference T and the distance L. In this case also, it can be considered that the lower the ranking information H, the more highly useful the advertising information is, and the ranking is to be placed at a high priority. The weighting coefficients c1 and c2 are multiplied respectively by the time difference T and the distance L, and H may be calculated as $$H = K(c1(T(c2(L)$$

Accordingly, the advertising information can be judged to be highly useful by emphasizing either the time difference T or the distance L.

The coefficient k may include at least one of moving speed information or moving direction information. Even though the time difference T is the same value, the distance that the wireless communication terminal moves within the time difference T is variable depending on the moving speed of the wireless communication terminal, but the coefficient k, which includes the moving speed information, can compensate for that effect. For example, the value of the coefficient k is large in the case of moving at a high moving speed, and the ranking information H which is calculated will be larger even though the time difference T is the same. Thus, such advertising information can be placed at a low priority.

Additionally, the coefficient k includes the moving direction information, that is, the information on the moving direction of the wireless communication terminal within the time difference T, which can much more accurately rank the advertising information that is highly useful and the advertising information that is not highly useful at the advertising information transmission time.

An advertising information display system according to another aspect of the present information, which displays, on the display of a wireless communication terminal that is capable of transmitting terminal location information, advertising information, which is transmitted from an advertising information transmission source that is capable of transmitting source location information and advertising information, is characterized by having an advertising server to obtain the terminal location information and the transmission time of that terminal location information, as well as obtain the transmission source location information and the advertising information and perform a ranking of the advertising information based on time difference information between the advertising information transmission time when the advertising information is transmitted to the wireless communication terminal, and the terminal location information transmission time, and location difference information between the terminal location information and the transmission source location information, as well as associate the advertising information with the ranking information and transmit it to the wireless communication terminal, and a displaying program to display the advertising information on the display of the wireless communication terminal, based on the ranking information.

In the case a plurality of the advertising information transmission sources are located near the location corresponding to the location information of the wireless communication terminal (terminal location information), the server performs a ranking for each advertising information transmitted by theses advertising information transmission sources, based on the location difference information and the time difference information, and the display program displays the advertising information on the display of the wireless communication terminal, based on that ranking information. Thus, the advertising information that is more effectively used by the wireless communication terminal user can be displayed preferentially. Additionally, high advertising effectiveness can be also obtained on the side of the advertising information transmission.

For example, it is much more convenient to the mobile telephone terminal user, and it is possible for the store to provide the information service which has high advertising effectiveness, by configuring the system so that the location information/the advertising information/the time information, etc. can be sent/received between a mobile telephone terminal as the wireless communication terminal and the store as the advertising information transmission source, and the server.

An advertising information ranking program according to still another aspect of the present invention, is characterized by operating a computer as a means to obtain the terminal location information transmitted by a wireless communication terminal and transmission time of that terminal location information, a means to obtain the transmission source location information and the advertising information transmitted by the advertising information transmission source, a means to perform a ranking of the advertising information based on time difference information between the advertising information transmission time when the advertising information is transmitted to the wireless communication terminal, and the terminal location information transmission time, and location difference information between the terminal location information and the transmission source location information, a means to transmit the advertising information by being associated the ranking information, to the wireless communication terminal, and a means to display the advertising information on the display of the wireless communication terminal, based on the ranking information.

In the case where a plurality of the advertising information transmission sources are located near the location corresponding to the location information of the wireless communication terminal (terminal location information), the ranking is performed for each advertising information transmitted by this advertising information transmission sources, based on the location difference information and the time difference information. Thus, the advertising information that is more effectively used by the wireless communication terminal user can be displayed preferentially. Additionally, the high advertising effectiveness can also be obtained on the side of the advertising information transmission.

An advertising information display program according to still another aspect of the present invention, is characterized by operating a computer as at least one of: a means to determine an order of displaying advertising information on a display of a wireless communication terminal based on ranking information determined based on the terminal location information of the wireless communication terminal, the transmission source location information of the advertising information transmission source, and the location information transmission time when the location information is transmitted by the wireless communication terminal, as well as associated with the advertising information transmitted by the advertising information transmission source, a means to determine the frequency of displaying the advertising information on the display of the wireless communication terminal, or a means to change the level of preferential treatment in the advertising information transmission source that transmits the advertising information.

In the case where a plurality of the advertising information transmission sources are located near the location corresponding to the location information of the wireless communication terminal (terminal location information), the advertising information display program displays on the display of the wireless communication terminal based on that ranking information. Thus, the advertising information that is more effectively used by the wireless communication terminal user can be displayed preferentially. Additionally, the high advertising effectiveness can be also obtained on the side of the advertising information transmission.

An advertising information display method according to still another aspect of the present invention, which displays, on the display of a wireless communication terminal, advertising information transmitted by an advertising information transmission source, is characterized by having a step to calculate advertising value information according to the distance between the wireless communication terminal and the advertising information transmission source, based on the prescribed advertising fees, a step to predict a click expected value which indicates the probability that the detailed information of that advertising information is browsed, in the case where the advertising information is displayed on the display, a step to perform a ranking of the advertising information based on the advertising value information and the click expected value, a step to associate the advertising information with the ranking information and transmit it to the wireless communication terminal, and a step to display the advertising information on the display of the wireless communication terminal, based on the ranking information.

Since the advertising value information is calculated based on the prescribed advertising fees, for example, the importance level is set according to the level of the advertising fees paid by an advertiser, and the importance level can be reflected in the advertising value information according to the advertising value information. Since that advertising value information is according to the distance between the wireless communication terminal and the advertising information transmission source, for example, the advertising value information can be placed at a low value by judging that the advertising value is reduced in the case where the distance is far and the advertising effectiveness is low.

Since the click expected value, which indicates the probability that the detailed information of that advertising information is browsed in the case where the advertising information is displayed on the display of the wireless communication terminal, is inferred, the click expected value will be the indicator that represents the level of the advertising effectiveness (i.e. advertising effectiveness validity). Generally, the advertising information displayed on the display of the wireless communication terminal is outline information, and further detailed information can be browsed by clicking the advertising information. For example, the click expected value may be defined as the rate of the number of times that the detailed information has been browsed by clicking the advertising information, out of the number of times that the advertising information has been displayed more than once on the same wireless communication terminal. Alternatively, it may be defined as the rate of the number of the wireless communication terminals that have browsed the detailed information by clicking the advertising information, out of the number of the wireless communication terminals that have displayed the advertising information. Naturally, this may also be combined statistical information including the number of the times and the number of the wireless communication terminals.

Since a ranking of the advertising information is performed based on this advertising value information and click expected value, the importance level and the advertising effectiveness validity can be appropriately reflected in the ranking of the advertising information. Since the advertising information can be displayed on the display of the wireless communication terminal based on that ranking information, the advertising information that has high importance and advertising effectiveness can be preferentially displayed on the display.

The advertising information display method further has a step to obtain the terminal location information of the wireless communication terminal, a step to obtain the transmission source location information of the advertising information transmission source, a step to calculate the location difference information between the terminal location information and the transmission source location information, and, in the step of calculating the advertising value information, the advertising value information may be calculated based on the advertising fees and the location difference information, as well as in the step of predicting of the click expected value, the click expected value may be predicted by the location difference information.

Since the terminal location information and the transmission source location information are obtained and the advertising value information is calculated based on their location difference information, the distance between the wireless communication terminal and the advertising information transmission source can be correctly determined, and the advertising value information can be appropriately calculated. For example, if it is set based on the advertising fees and the given exponential so that the advertising value is reduced according to the increase in the distance between the wireless communication terminal and the advertising information transmission source, the importance level and the advertising effectiveness validity of the advertisement can be appropriately reflected in the advertising value information.

Since the click expected value is predicted based on the location difference information calculated by the terminal location information and transmission source location information which have been obtained, the prediction accuracy of the click expected value will be improved. Accordingly, the importance level and the advertising effectiveness validity of the advertisement can be further appropriately reflected in the ranking of the advertising information.

Additionally, the advertising information display method further has a step to obtain the transmission time of the terminal location information, and, in the step of calculating the advertising value information, the advertising value information may be calculated based on the advertising fees, the location difference information, and the time difference information between the advertising information transmission time when the advertising information is transmitted to the wireless communication terminal and the terminal location information transmission time, as well as in the step of predicting of the click expected value, the click expected value may be predicted based on the location difference information and the statistics information of the number of times that the detailed information of the advertising information has been browsed on the display.

Since the advertising value information is calculated based on the time difference information, the advertising effectiveness validity can be reflected in the advertising value information according to the time. For example, by configuring it so that the advertising value is reduced according to the time elapsed after the terminal location information transmission time, the importance level and the advertising effectiveness validity of the advertisement can be appropriately reflected in the advertising value information.

Since the click expected value is predicted based on the location difference information and the statistics information of the number of times that the detailed information of the advertising information has been browsed on the display, that is, the statistics of the actual observed value where the advertising information was actually clicked in the past, the prediction accuracy of the click expected value will be improved. Additionally, since learning effectiveness is expected in the process of predicting the click expected value, it is expected that the prediction accuracy will be dramatically improved. Consequently, the importance level and the advertising effectiveness validity of the advertisement can be most appropriately reflected in the ranking of the advertising information.

An advertising information display method according to still another aspect of the present invention, which displays, on the display of a wireless communication terminal, the advertising information transmitted by an advertising information transmission source, is characterized by having a server to calculate advertising value information according to the distance between the wireless communication terminal and the advertising information transmission source, based on the prescribed advertising fees, as well as to predict a click expected value which indicates the probability that the detailed information of that advertising information is browsed, in the case where the advertising information is displayed on the display, and to perform a ranking of the advertising information based on the advertising value information and the click expected value, and to transmit the advertising information to the wireless communication terminal by being associated with the ranking information, and a display program to display the advertising information on the display of the wireless communication terminal, based on the ranking information.

Since the advertising value information is calculated based on the prescribed advertising fees, for example, the importance level is set according to the level of the advertising fees paid by an advertiser, and the importance level can be reflected in the advertising value information. Since that advertising value information is according to the distance between the wireless communication terminal and the advertising information transmission source, for example, the advertising value information can be placed at a low value by judging that the advertisement value is reduced in the case where the distance is far and the advertising effectiveness is low.

Since the click expected value, which indicates the probability that the detailed information of that advertising information is browsed, is inferred, in the case where the advertising information is displayed on the display of the wireless communication terminal, the click expected value will be the indicator that represents the advertising effectiveness validity.

Since a ranking of the advertising information is performed based on this advertising value information and click expected value, the importance level and the advertising effectiveness validity can be appropriately reflected in the ranking of the advertising information. Since the advertising information can be displayed on the display of the wireless communication terminal based on that ranking information, the advertising information, which has high importance and advertising effectiveness, can be preferentially displayed on the display.

An advertising information ranking program according to still another aspect of the present invention, is characterized by operating a computer as a means to calculate advertising value information according to the distance between the wireless communication terminal which displays the advertising information on the display and the advertising information transmission source which the advertising information is transmitted, based on the prescribed advertising fees, a means to predict a click expected value that indicates the probability that the detailed information of that advertising information is browsed, in the case the advertising information is displayed on the display of the wireless communication terminal, and a means to perform a ranking of the advertising information based on the advertising value information and the click expected value.

Since the advertising value information is calculated based on the prescribed advertising fees, for example, the importance level is set according to the level of the advertising fees paid by an advertiser, and the importance level can be reflected in the advertising value information. Since that advertising value information is according to the distance between the wireless communication terminal and the advertising information transmission source, for example, the advertising value information can be placed at a low value by judging that the advertising value is reduced in the case where the distance is far and the advertising effectiveness is low.

Since the click expected value, which indicates the probability that the detailed information of that advertising information is browsed, is inferred, in the case where the advertising information is displayed on the display of the wireless communication terminal, the click expected value will be the indicator that represents the advertising effectiveness validity.

Since the ranking of the advertising information is performed based on this advertising value information and click expected value, the importance level and the advertising effectiveness validity can be appropriately reflected in the ranking of the advertising information.

An advertising information display program according to still another aspect of the present invention, is characterized by operating a computer as at least one of: means to determine an order of displaying advertising information on a display of a wireless communication terminal based on ranking information determined based on advertising value information calculated according to the distance between the wireless communication terminal and a advertising information transmission source which transmits the advertising information, on the prescribed advertising fees and a click expected value which indicates the probability that the detailed information of that advertising information is browsed, in the case the advertising information is displayed on the display of the wireless communication terminal, as well as associated with the advertising information, means to determine the frequency of displaying the advertising information on the display of the wireless communication terminal, or means to change the level of preferential treatment in the advertising information transmission source that transmits the advertising information.

The advertising display program displays on the display of the wireless communication terminal, the advertising information that has been ranked based on the advertising value information and the click expected value, based on that ranking information. Thus, the advertising information that is more effectively used by the wireless communication terminal user can be displayed preferentially. Additionally, the high advertising effectiveness can be also obtained on the side of the advertising information transmission.

Other objectives or further features of the present invention will be become readily apparent from the following description of the preferred embodiments with reference to the accompanying drawings.

Effects of the Invention

According to the present invention, further highly useful advertising information, that is, the advertising information of advertising information transmission source locating close to the place where the wireless communication terminal user is located, can be displayed by using the location information and time information. Thus, it is convenient to the wireless communication terminal user, and it is possible for an advertising information provider to obtain high advertising effectiveness.

Since a ranking of the advertising information is performed based on the advertising value information and the click expected value, the importance level and the advertising effectiveness validity can be appropriately reflected in that ranking. Then the advertising information that is important and has high advertising effectiveness can be preferentially displayed on the display of the wireless communication terminal.

PREFERRED EMBODIMENT OF THE INVENTION

Embodiment 1

Referring to FIG. 1 and 2, a description will be now given of the embodiments of the present invention. FIG. 1 is a schematic block diagram illustrating the overall structure of an advertising information display system S. This advertising information display system S is configured to have a server 1 which sends/receives information between a mobile telephone device 2 as a wireless communication terminal, and a store 3 as an advertising information transmission source.

The mobile telephone device 2 includes a function of measuring one's location information (terminal location information) 2p. The location measurement function may be the one using GPS (Global Positioning System) System, or the one measuring the location by sending/receiving information between a plurality of mobile telephone base stations. Also, there is a function to transmit the measured terminal location information 2p to the server 1.

The mobile telephone device 2 includes a display 2b (also refer to FIG. 3) on a chassis 2a, and a computer 2c within which a display program is stored. This display 2b is a liquid crystal display to display various functions of the mobile telephone, and advertising information described below is also to be displayed on this display 2b.

The display program configures a part of the advertising information display system, and displays on the display 2b based on the advertising information transmitted from the server 1. The display program also includes a function as a display program to determine the order of displaying a plurality of the advertising information on the display 2b, based on that ranking information.

The store 3 includes a function to transmit the advertising information 3a and the location information as one's location information (transmission source location information. hereinafter referred to as "store location information") 3p to the server 1. The advertising information 3a of the store 3 may include information on a discount coupon available in the store. As described below, the discount rate may be variable depending on the ranking of the advertising information 3a.

The server 1 sends/receives the information between the mobile telephone device 2 and the store 3, and has a computer 1a, within which an advertising information transmission program is stored. The advertising information ranking program within the server 1 operates the computer 1a as a means to obtain the terminal location information 2p transmitted from the mobile telephone device 1 and the time tm, when the terminal location information 2p has been transmitted (terminal location information transmission time). As used herein, of course it is obvious that the terminal location information transmission time tm may be the time when the server 1 has received the terminal location information 2p. Additionally, the advertising information ranking program operates the computer 1a as a means to obtain the advertising information 3a and the store location information 3p which have been transmitted by the store 3a, and transmit that advertising information 3a to the mobile telephone device 2.

In that transmission, the advertising information ranking program operates the computer 1a as a means to perform a ranking of the advertising information 3a based on the location information and the time information, and transmit to the mobile telephone device 2 after associating that ranking information H with the advertising information 3a. The ranking is performed by calculating the ranking information H3 in accordance with the following procedures.

The time difference information (time difference) between the terminal location information transmission time tm and the advertising information transmission time ta when the advertising information 3a is transmitted to the mobile telephone device 2, T=ta−tm is calculated. The location difference information (distance) between the terminal location information 2p and the store location information 3p, L=|3p−2p| is calculated. Also, the ranking information H3 represented by the following formula is calculated.

$$H = k \times T \times L \text{ (where, } k \text{ is coefficient)} \tag{1}$$

The advertising information ranking program makes it possible to transmit to the mobile telephone device 2 after associating the advertising information 3a with this ranking information H.

Next, the operation of this advertising information display system S will be described based on the flowchart shown in FIG. 2.

In advance, the advertising information 3a and the store location information 3p are transmitted to the server 1. For example, if there are a plurality of stores such as stores 3 and 30, the advertising information 3a and 30a and the store location information 3p and 30p for each store are transmitted to the server 1 (S.1). This advertising information 3a and 30a is transmitted to the server 1 from time to time, and updated and stored if necessary.

For example, when the user of the mobile telephone device 2 intends to display a menu list for browsing the information, the screen which prompts the acquisition of the present location information is displayed on the display 2b of the mobile telephone device 2 in advance, as shown in FIG. 3(*a*). At this stage, if the user selects the icon 4 "Acquire the present location information" (S.2), the location information of the mobile telephone device 2 (terminal location information) 2p will be obtained by the location measurement system (e.g. GPS system) and the information will be transmitted to the server 1 (S.3). Together with this, the time tm when that terminal location information 2p has been transmitted to the server 1 (terminal location information transmission time) will be also transmitted to the server 1 (S.3).

Based on the terminal location information 2p and the terminal location information transmission time tm which have been obtained, and the advertising information 3a and 30a and the store location information 3p and 30p which have been obtained in advance, as well as the advertising information transmission time ta which the server 1 transmits the advertising information 3a and 30a to the mobile telephone device 2, the ranking information H3 and H30 will be calculated by the computer 1a within the server 1 for each advertising information 3a and 30a (S.4).

The principle of the calculation of the ranking information H3 and H30 will be described with the use of FIG. 4. In FIG. 4, the lateral axis represents the time and a longitudinal axis represents the location. It is assumed that the location where the user of the mobile telephone device 2 is located (the location corresponding to the terminal location information 2p) is X, the location of the store 3 (the location corresponding to the store location information 3p) is Y, and the location of store 30 (the location corresponding to the store location information 30p) is Z. The terminal location information transmission time is tm. The ranking information H3 and H30 for each of advertising information 3a and 30a of the store 3 and 30 at the time ta when the server 1 transmits the advertising information 3a and 30a to the mobile telephone device 2, are respectively calculated. For example, the ranking information H3 for the advertising information 3a is represented by $$H3 = k \times (ta - tm) \times (|Y - X|) \tag{2}$$

This will be the value corresponding to the area of rectangular area A1 shown by cross hatching in FIG. 4. Meanwhile, the ranking information H30 for the advertising information 30a is represented by $$H30 = k \times (ta - tm) \times (|Z - X|) \tag{3}$$

This will be the value corresponding to the area of rectangular area A2 (the area encompassing the rectangular area A1) shown by cross hatching in FIG. 4.

As is apparent from FIG. 4, the area of the rectangular area A1 is smaller than the area of the rectangular area A2. Accordingly, the ranking information H3 is smaller than the ranking information H30 and the advertising information 3*a* is to be placed as a higher priority than the advertising information 30*a*. These ranking information H3 and H30 are respectively associated with the advertising information 3*a* and 30*a*, and the advertising information 3*a* and 30*a* are transmitted to the mobile telephone device 2 by the server 1 (S.5).

The advertising information 3*a* and 30*a* are displayed together with the menu list 5 on the display 2*b* of the mobile telephone device 2, which has received the advertising information 3*a* and 30*a*, as shown in FIG. 3(*b*) (S.6). At this stage, the advertising information 3*a* and 30*a* are respectively displayed based on the ranking information H3 and H30. In other words, the advertising information 3*a* corresponding to the ranking information H3 having the high priority is preferentially displayed compared to the advertising information 30*a* corresponding to the ranking information H30 having the low priority. As used herein, "preferentially display" means, for example, displaying on the upper part or the part closer to the top, displaying in an enlarged manner, and displaying by the addition of a more outstanding icon. Additionally, in the case of displaying the new advertising information on the display whenever the menu list is updated, it is meant to be repeatedly displayed more frequently than other advertising information.

In the above embodiment, an advertising information ranking program is stored in the computer 1*a* within the server 1 and calculates the ranking information, but of course it is obvious that the computer 2*c* within the mobile telephone device 2 receives the time difference information T and the location difference information L together with the advertising information 3*a* from the server 1 and calculate the ranking information H3 and H30 associated with the advertising information 3*a* and 30*a*.

In this embodiment, the priority of displaying the advertising information (i.e. the order of display/the size of display/addition of an outstanding icon, etc.) is determined based on the ranking information, but the discount rate of the coupon available for the store, which has sent the advertising information, may vary based on the ranking information.

The advertising information become more attractive to the user by corresponding the high discount rate of the coupon to the advertising information having a small rank value and a high priority, which can lead to the high advertising effectiveness by improving the appeal power. Meanwhile, on the contrary, the advertising effectiveness can be enhanced to the advertising information having low advertising effectiveness according to the attractiveness of the rate of the coupon by corresponding the high discount rate of the coupon to the advertising information having a high rank value and a low priority.

As the advertising information having a small rank value and a high priority can obtain the high advertising effectiveness, the advertising fees, which are worth the advertising effectiveness, can be charged. Thus, the advertising fees, which are worth the advertising effectiveness, can be automatically charged by adjusting the charging of the advertising fees according to the ranking information of the advertising information.

Embodiment 2

In the above embodiment 1, the ranking information H3 and H30 for the advertising information 3*a* and 30*a* are calculated by $$H = k \times T \times L \text{ (where, } k \text{ is coefficient)} \tag{1}$$

This uses the time difference information T and the location difference information L, but it may be also calculated by $$H = k(c1 \times T + c2 \times L) \text{ (where, } k \text{ is coefficient)} \tag{4}$$

Here, c1 is a weighting coefficient for the time difference and c2 is a weighting coefficient for the distance difference. The larger the time difference information T and the location difference information L are, the higher ranking information H is (in other words, the priority of the advertising information corresponding to the ranking information H becomes low). By calculating the ranking information H based on Formula (4), the ranking can be performed by emphasizing either the time difference information T or the location difference information L.

For example, the advertising effectiveness will not be reduced very much even though the distance between the mobile telephone device 2 and the stores 3 and 30 are far (in other words, the location difference information L is large), but the advertising information 3*a* and 30*a* are old (in other words, the time difference information T is large), the weighting coefficient for the time difference c1 is to be set larger compared to the weighting coefficient for the distance difference c2 in the case the advertising effectiveness are notably reduced. By doing so, the change of the advertising effectiveness caused by the time difference can be more reflected in the ranking information than the change of the advertising effectiveness caused by the distance.

The coefficient k is configured to include moving speed information of the mobile telephone device 2. For example, the moving speed V of the mobile telephone device 2 can be calculated based on the past few of (at least the past 2) the terminal location information 2*p* and that terminal location information transmission time tm, which have been obtained by the mobile telephone device 2. By including this moving speed V in the coefficient k and representing, for example, $k = k1 \times V$ (in this case, k is the given coefficient), the ranking of the advertising information 3*a* and 30*a* can be performed according to the moving speed of the mobile telephone device 2. In other words, even though the time difference information T and the location difference information L are the same, the priority of the advertising information 3*a* and 30*a* which have a high moving speed V, can be placed a slower than the priority of the advertising information 3*a* and 30*a* which have a low moving speed V.

The coefficient k may be configured to include moving direction information of the mobile telephone device 2. Likewise, the moving direction D1 of the mobile telephone device 2 can be calculated based on the past few of (at least the past 2) the terminal location information 2*p* and that terminal location information transmission time tm. Additionally, the store direction D2 directed to the store from the location of the mobile telephone device 2, can be also calculated based on the latest terminal location information 2*p* and the store location information. These direction D1 and D2 may be a numerical value represented by clockwise rotation angle which is indicated as North is 0.

By including these directions D1 and D1 in the coefficient k and representing, for example, $k = k1 \times |D2 - D1|$ (in this case, k is coefficient), the ranking of the advertising information 3*a* and 30*a* of each of the stores 3 and 30 can be performed according to the moving direction of the mobile telephone device 2. In other words, the closer the store direction D2 and moving direction D1 of the mobile telephone device 2 are, the higher the priority of the advertising information of that store can be placed.

Embodiment 3

Advertising information display system S will be described according to the embodiment 3 of the present invention. The same symbols are used for, and the explanation will be omitted for the components, which are the same as in the embodiment 1.

This advertising information display system S has a server 1, which is capable of sending/receiving the information between a mobile telephone device 2 and a store 3. The server has a computer 1a, within which an advertising information ranking program (refer to FIG. 1). The advertising information ranking program within the server 1 operates as a means to calculate the advertising value information CPC (refer to FIG. 5) according to the distance between the mobile telephone device 2 and the store 3, based on the prescribed advertising fees, and means to perform a ranking of the advertising information 3a and 30a based on the advertising value information CPC and a click expected value CTR (refer to FIG. 7). It is obvious that the computer 1a can operate as a means to obtain the terminal location information 2p, the terminal location information transmission time tm, the transmission source location information 3p and 30p, and the advertising information 3a and 30a. The procedures for ranking the advertising 3a will be described below.

The advertising value information CPC is a numerical value, which indicates the importance level of the advertising information, and is to be calculated based on the advertising fees prescribed by an advertiser (a store owner of the store 3), etc. and the distance L between the mobile telephone device 2 and the store 3. For example, the advertising fees in the case of the distance L=0 km are set as $P_0$ in advance, and the advertising fees in the case of the distance L=20 km are set as $P_{20}$ in advance, and then, the advertising value information CPC according to the distance is calculated by the computer 1a by defining the function f(L) as $$CPC=f(L) \qquad (5)$$

where, $CPC_{[L=0]}=f(0)=P_0$ $CPS_{[L=20]}=f(20)=P_{20}$ (refer to FIG. 5). An arbitrary function is considered as the function f(L), for example, an exponential function or a direct function can be applicable. Generally, a function is selected in which the larger the distance L, the smaller the advertising value information CPC.

Additionally, the advertising value information CPC is calculated based on the time difference T between the terminal location transmission time tm and the advertising information transmission time ta. For example, it is set in advance that, in the case where the time difference T of less than 6 hours, the advertising fees in the case where the distance L=0 km is $P_0$ and the advertising fees in the case of the distance L=20 km is $P_{20}$, and in the case where the time difference T of 6 hours and above, the advertising fees in the case o the distance L=0 km is $P_6$ and the advertising fees with the distance L=20 km is $P_{26}$. In the case where the time difference T is less than 6 hours, the advertising value information CPC is calculated by the formula (5), and in the case where the time difference T is 6 hours and above, the advertising value information CPC is calculated by the formula (6).

$$CPC=g(L) \qquad (6)$$

where, $CPC_{[L=0]}=g(0)=P_6$ $CPC_{[L=20]}=g(20)=P_{26}$

Here, the function g(L) may be the same as the function f(L), or other exponential function or direct function. It is obvious that the advertising value information CPC may be calculated based on the following formula (7) without distinguishing the time difference T between the case that it is less than 6 hours and the case that it is 6 hours and above.

$$CPC=h(L, T) \qquad (7)$$

Where, $CPC_{[L=0, T=0]}=h(0,0)=P_0$ $CPC_{[L=20, T=0]}=h(20,0)=P_{20}$ $CPC_{[L=0, T=6]}=h(0,6)=P_6$ $CPC_{[L=20, T=6]}=h(20,6)=P_{26}$ An arbitrary function is considered as the function h(L, T), for example, an exponential function or a direct function can be applicable. Generally, a function is selected such that the larger the distance L, the smaller the advertising value information CPC, as well as, the larger the time difference T, the smaller the advertising value information CPC.

The click expected value CTR is a numerical value, which indicates the probability that the detailed information of that advertising information is browsed in the case where the advertising information is displayed on the display 2b of the mobile telephone device 2. For example, at first, the outlined information of the advertising information 3a is displayed together with a menu list 5 on the display 2b of the mobile telephone device 2, as shown in FIG. 6(a). The user of the mobile telephone device 2 clicks on the highlighted advertising information, and then the detailed information of the advertising information 3a is browsably displayed on the display 2b, as shown in FIG. 6(b). Compared to the case only the outlined information of the advertising information 3a is displayed on the display 2b, it is believed that extremely high advertising effectiveness has been developed in the case the detailed information of the advertising information 3a has been browsed. Thus, by defining the expected value as the probability that the detailed information of the advertising information 3a would be browsed, and predicting based on the probability that the detailed information is browsed (=the number of times that the detailed information of the advertising information 3a is browsed/the number of times that the outlined information of the advertising information 3a is displayed on the display 2b), it will be the numerical value that indicates that advertising effectiveness.

As shown in FIG. 7, the click expected value CTR is a numerical value which is variable depending on the distance L, and can be represented as the function j(L) of the distance L. Generally, the farther the distance L is, the less the expected value CTR is reduced. However, it is difficult to determine how much the click expected value is reduced according to the increased distance L, because of the popularity of the store 3 and the contents of the advertising information 3a. Additionally the click expected value CTR and the reduced degree thereof is different depending on each store. Accordingly, the click expected value for each advertising information is predicted by the computer 1a.

The prediction calculation is performed based on the learning calculation using the neural-network. In other words, each distribution data of the terminal location information 2p in the case where the outlined information of the advertising information 3a has been displayed on the display 2b of the mobile telephone device 2, and the terminal location information 2p in the case where the detailed information of the advertising information 3a has been browsed, is obtained, and the statistics are taken for them. By that the distribution data, the statistics information about the number of times that the outlined information of the advertising information 3a has been displayed and the number of times that the detailed information has been browsed is calculated in the given distance L, and the probability that the detailed information of the advertising information 3a is browsed is calculated. A plurality of □ shown in FIG. 7 represent the distribution of the observed value R of the probability that the detailed information of the advertising information 3a is browsed in each distance L. The click expected value CTR of the advertising information 3a in each distance L is predicted based on that statistics information.

As described above, since the click expected value CTR is predicted based on the past statistics information, the more the accumulation of the information is increased, the more the accuracy of the prediction is improved, and the predicted value of the click expected value will vary due to the variation in the statistics information.

Based on the advertising value information CPC and the predicted click value information CTR calculated as the above, the ranking information H3 is calculated by the following formula (8) in the case of the given distance L and the given time difference T.

$$H3 = k2/(CTC \times CPR) \text{ (where, } k2 \text{ is a coefficient)} \tag{8}$$

Not just the ranking information H3 of the advertising information 3a, but the ranking information H (e.g. the ranking information H30) is also calculated for other advertising information (e.g. the advertising information 30a), and then the advertising information having a small rank value is placed at a high priority.

The advertising information ranking program transmits this ranking information H3 by being associated with the advertising information 3a to the mobile telephone device 2. The ranking information H is also calculated for the advertising information 30a and other advertising information and is respectively transmitted to the mobile telephone device 2 after being associated.

The computer 2c located within the mobile telephone device 2 determines the order and frequency of displaying the advertising information 3a on the display 2b. In other words, the advertising information having a small rank value is displayed on the display 2b in the higher priority than the advertising information having a large rank value, by comparing the ranking information H3 of the advertising information 3a with the ranking information of other advertising information.

In the case where there is a plurality of display space for the advertising information on the display 2b of the mobile telephone device 2, in the same way as the embodiment 1, the advertising information having high priority is displayed in an enlarged manner, displayed at a location closer to the top of the display 2, and displayed by the addition of a more outstanding icon, than the advertising information having low priority (refer to FIG. 3(b)). On the contrary, in the case where there is only one display space for the advertising information, the advertising information having high priority is displayed more frequently than the advertising information having low priority. For example, in the case where the user of the mobile telephone device 2 has updated and displayed the menu list 5 ten times, and in the case where new advertising information is displayed on the display 2b in each case, the advertising information having high priority may be displayed 7 times out of 10 times that it is updated and displayed, and the advertising information having low priority may be displayed 3 times. It is obvious that the frequency of displaying each item of advertising information (the probability of display) may be set to be proportional to each ranking information H calculated by the formula (6).

The preferred embodiments of the present invention have been described above, but the present invention is not limited to these embodiments, and various changes and modifications can be made within the scope of the present invention.

EXPLANATION OF THE SYMBOLS

Figure 1:
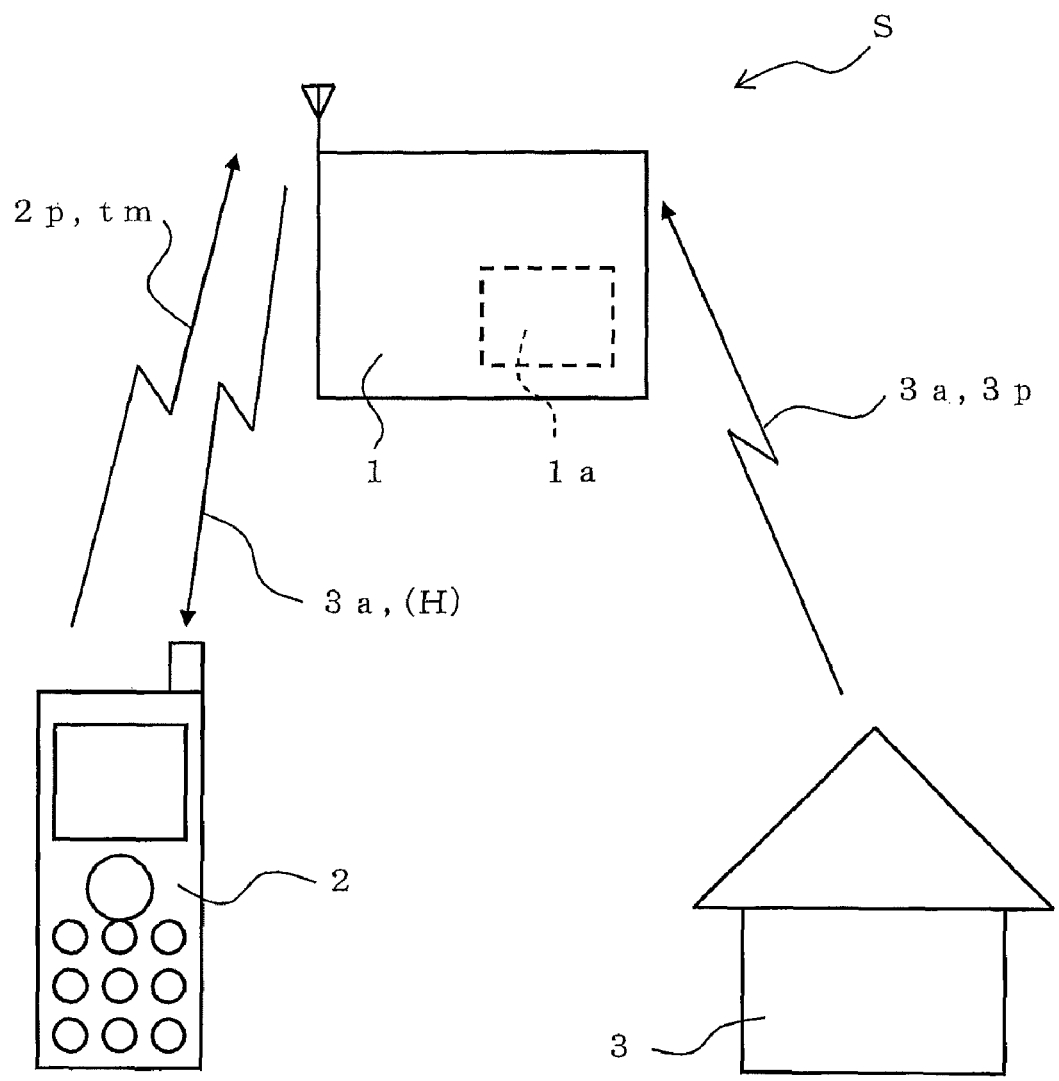
FIG. 1 is a schematic block diagram illustrating the overall structure of an advertising information display system, according to the embodiments of the present invention.
Figure 2:
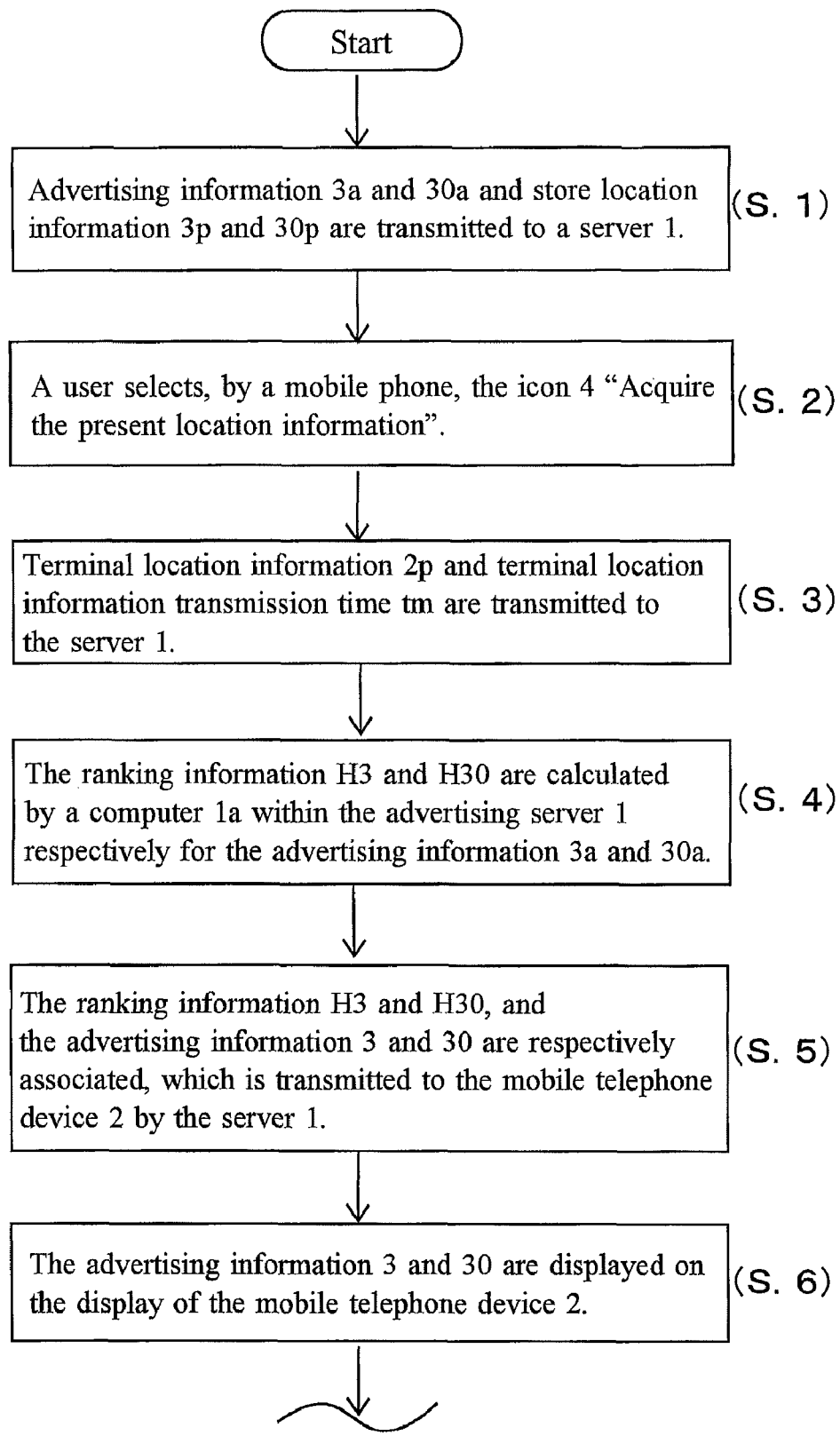
FIG. 2 is a flow chart illustrating the operation of the advertising information display system shown in FIG. 1.
Figure 3A:
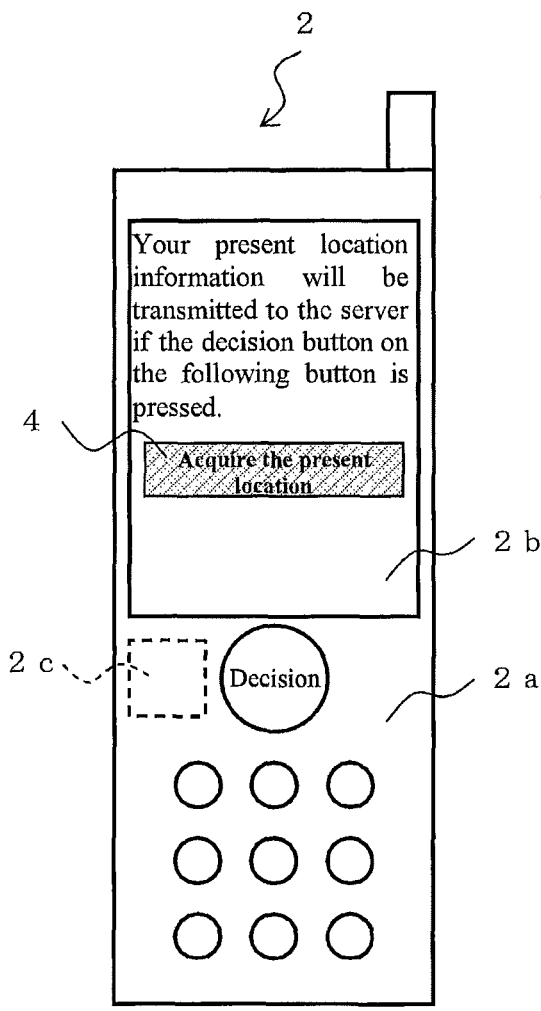
FIG. 3 is a diagram illustrating an example of the screen display of the display of a mobile telephone device, which is used by the advertising information display system shown in FIG. 1.
Figure 3B:
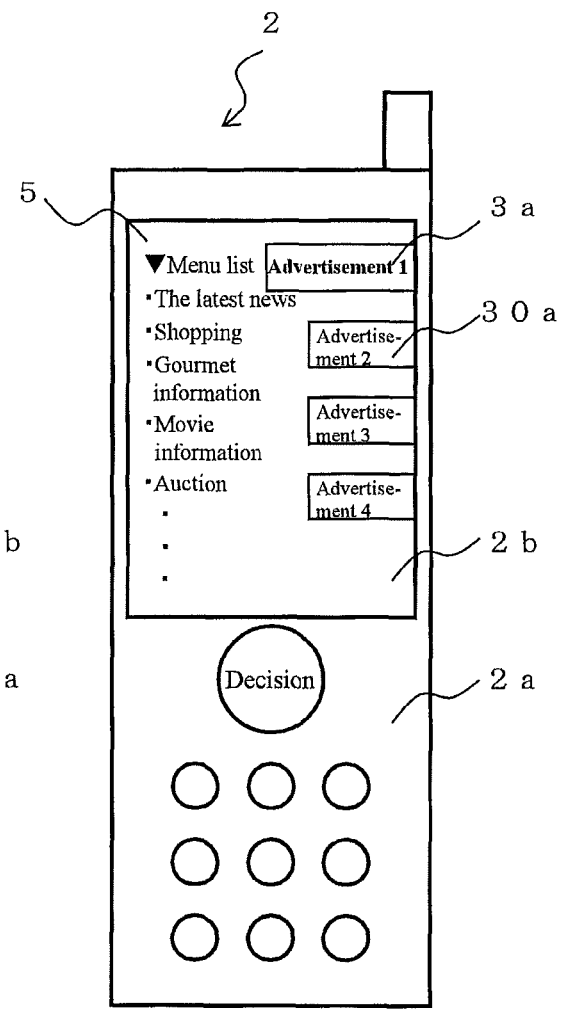
Figure 4:
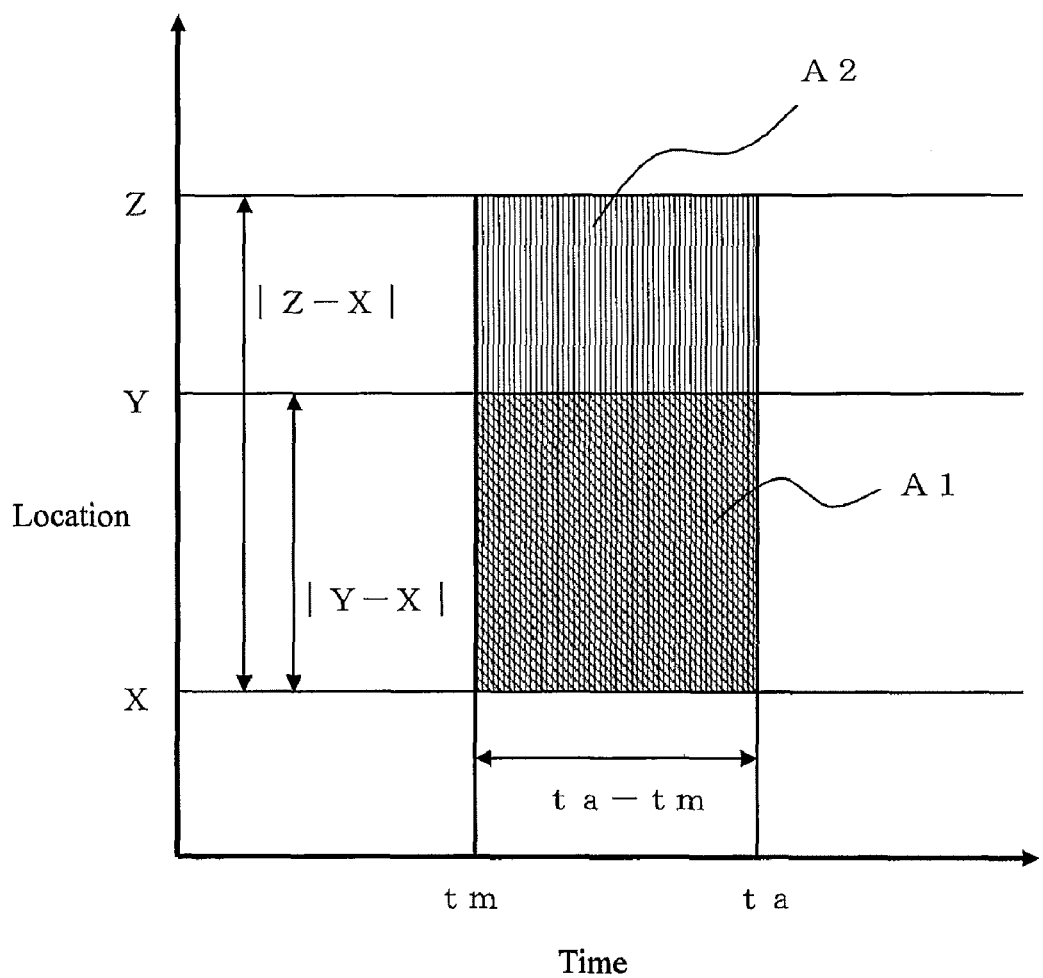
FIG. 4 is a diagram showing the principle of calculating ranking information.
Figure 5:
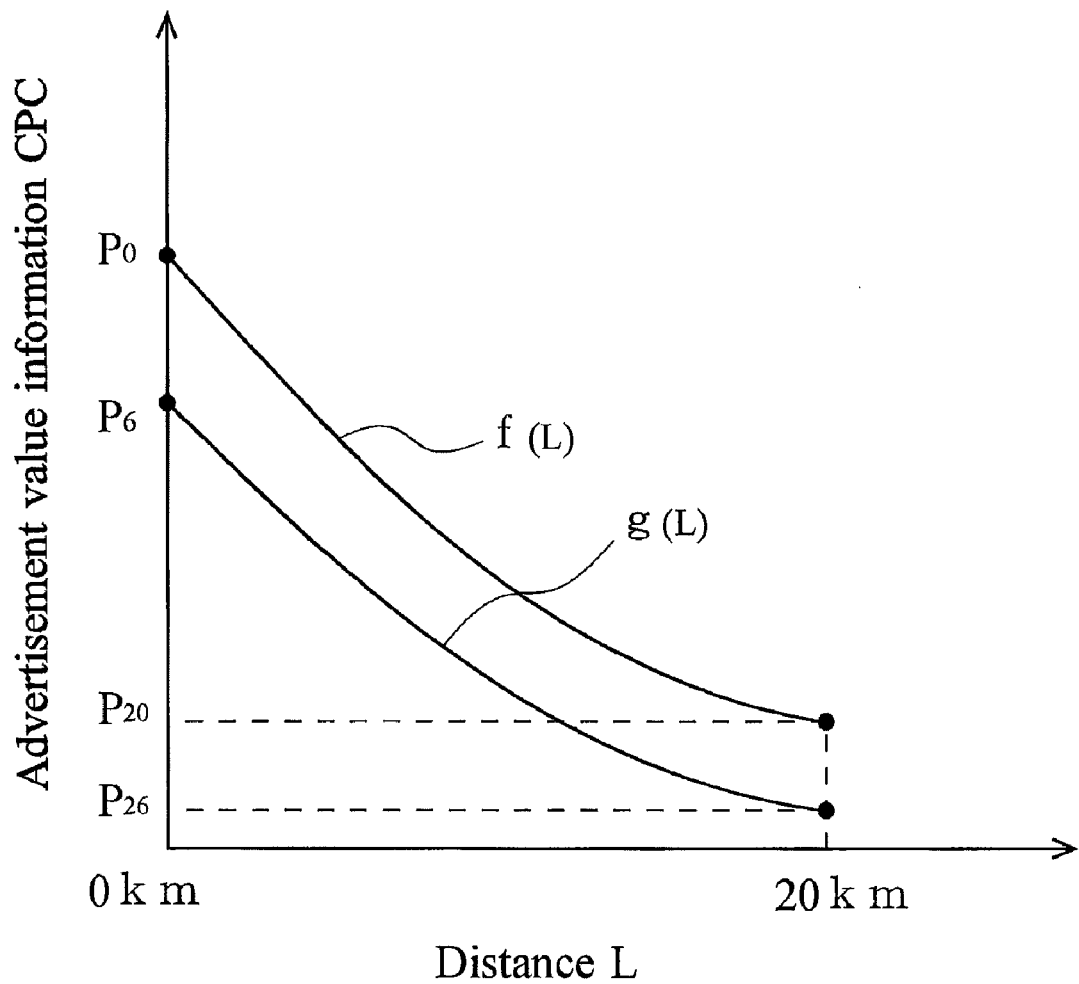
FIG. 5 is a graph showing the relationship between advertising value information and distance.
Figure 6A:
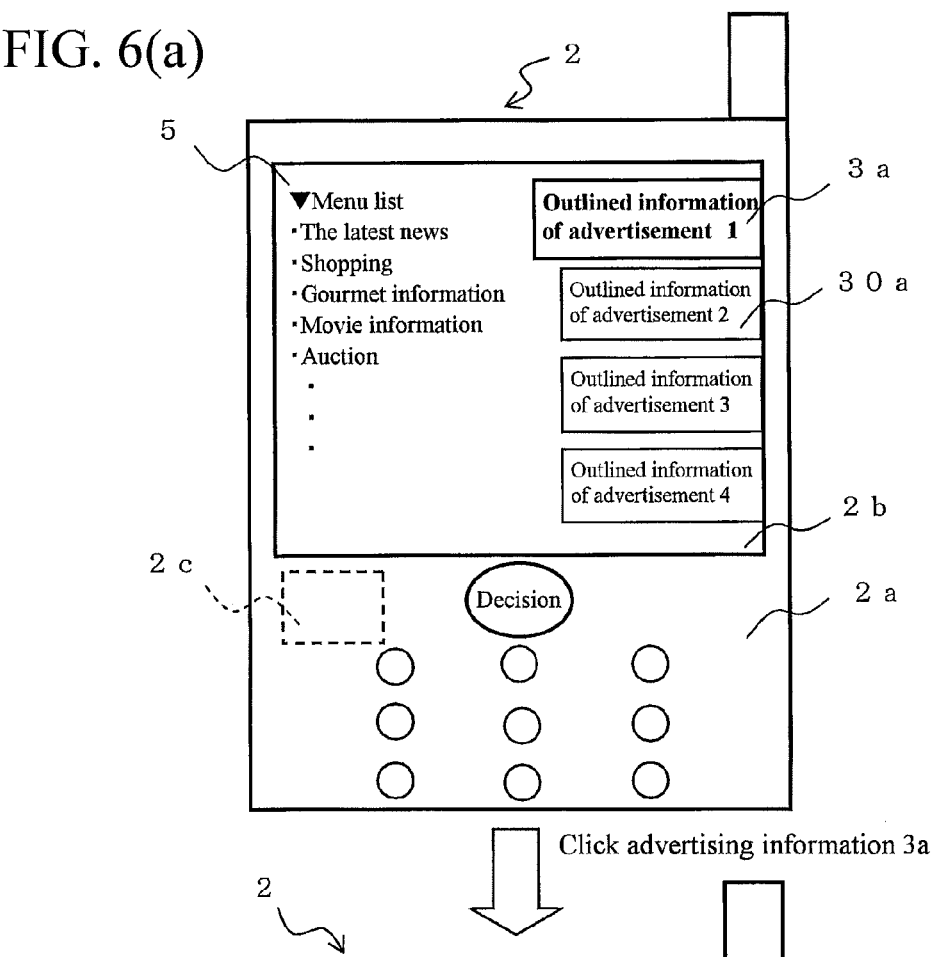
FIG. 6 is a diagram illustrating examples of the screen display of a mobile telephone device, and (a) illustrates the status in which the outlined information of the advertising information is displayed on the display and (b) illustrates the status in which the detailed information of the advertising information is displayed on the display.
Figure 6B:
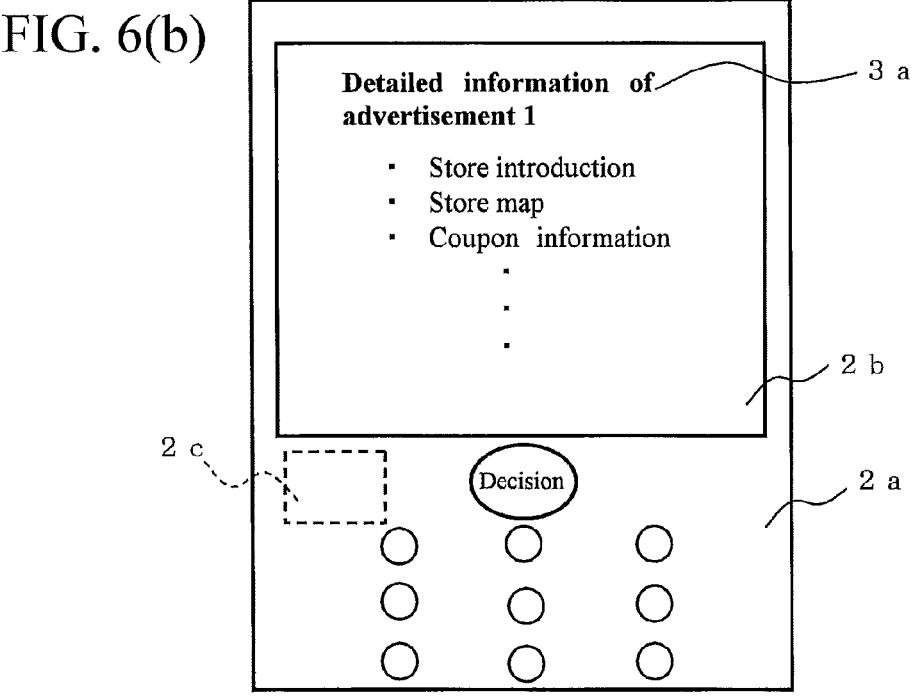
Figure 7:
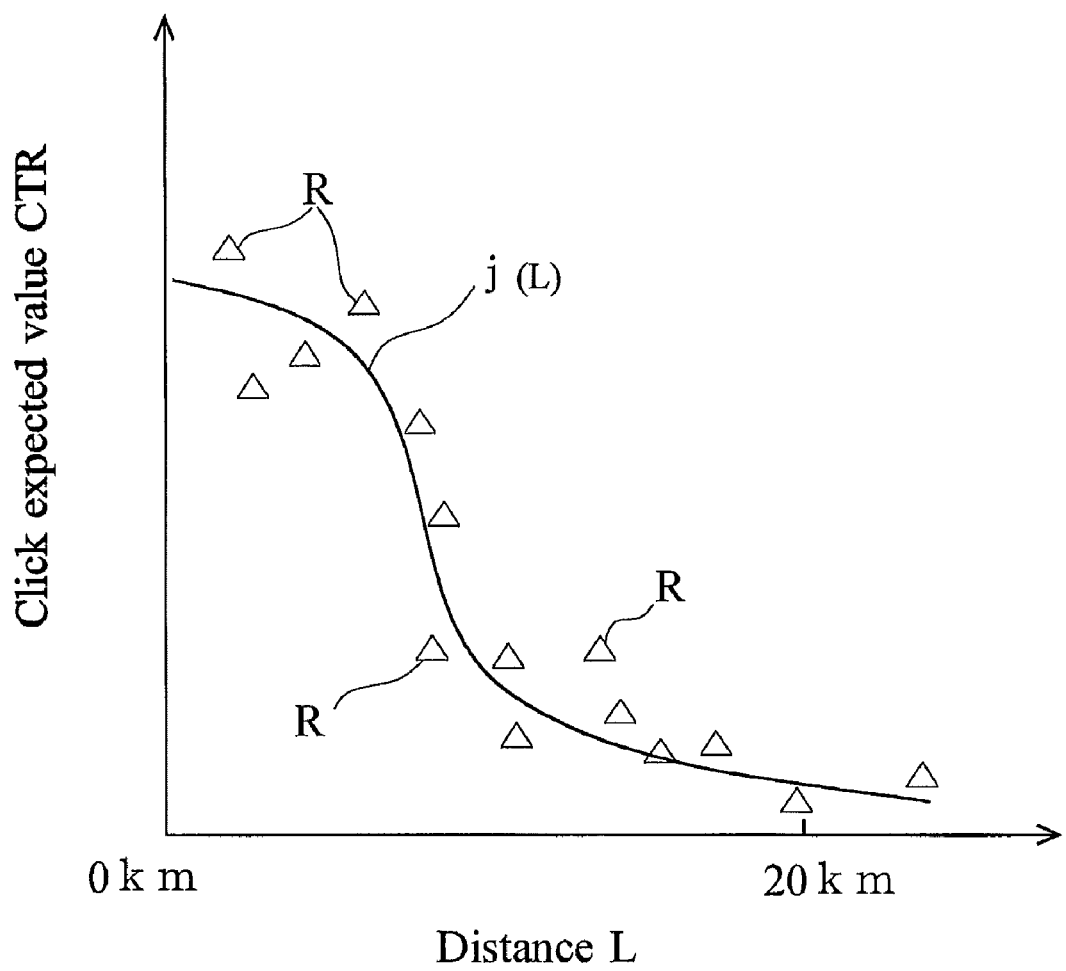
FIG. 7 is a graph showing the relationship between click expected value and distance.

A1, A2: Rectangular area
CPC: Advertising value information
CTR: Click expected value
D1: Moving direction
D2: Store direction
H, H3 and H30: Ranking information
$P_0$, $P_6$, $P_{20}$, and $P_{26}$: Advertising fees
S: Advertising information display system
V: Moving speed
X: Location where a mobile telephone user exists
Y: Location of store 3
Z: Location of store 30
L: Distance (Location information difference information)
T: Time difference (Time difference information)
ta: Advertising information transmission time
tm: Terminal location information transmission time
1: Server
1a and 2c: Computer
2: Mobile telephone device (Wireless communication terminal)
2a: Chassis
2b: Display
2p: Terminal location information
3 and 30: Store (Advertising information transmission source)
3a and 30a: Advertising information
3p and 30p: Store location information (Transmission source location information)
4: "Acquire the present location" icon
5: Menu list

The invention claimed is:

1. An advertising information providing method, which provides advertising information to a communication terminal that is capable of transmitting terminal location information, said advertising information is transmitted from an advertising information transmission source that is capable of transmitting transmission source location information and advertising information, where the method comprising:
- a step for obtaining the terminal location information and transmission time of the terminal location information,
- a step for obtaining the transmission source location information and advertising information,
- a step for ranking the advertising information based on time difference information between advertising information transmission time when the advertising information is transmitted to the communication terminal and the terminal location information transmission time, and on location difference information between the terminal location information and the transmission source location information; and
- a step for providing the advertising information in association with the ranking information to the communication terminal.

2. The advertising information providing method according to claim 1, wherein the communication terminal is a mobile telephone terminal.

3. The advertising information providing method according to claim 1, further comprising at least one of:
- a step for determining an order of displaying the advertising information on a display of the communication terminal based on the ranking information,
- a step for determining a frequency of displaying the advertising information on the display of the communication terminal based on the ranking information,
- a step for changing a level of preferential treatment in the advertising information transmission source that transmits said advertising information based on the ranking information; and
- a step for adjusting charging of the advertising fees to the advertising information transmission source that transmits said advertising information based on the ranking information.

4. The advertising information providing method according to one of claims 1 to 3, wherein said ranking step further comprising placing advertising information having smaller ranking information H at a higher priority than advertising information having larger said ranking information H, where H represented by the following formula,
- a time difference basing on time difference information between the advertising information transmission time and the terminal location information transmission time being represented as T,
- and a distance basing on location difference information between the terminal location information and transmission source location information being represented as L, $$H = k \times T \times L \text{ (where, } k \text{ is a coefficient).}$$

5. The advertising information providing method according to claim 4, wherein the coefficient k includes at least one of moving speed information and moving direction information of the communication terminal.

6. An advertising information providing system, which provides advertising information to a communication terminal that is capable of transmitting terminal location information, said advertising information is transmitted from an advertising information transmission source that is capable of transmitting source location information and advertising information, the system comprising
an advertising server which:
- obtains the terminal location information, a transmission time of the terminal location information, the transmission source location information and the advertising information,
- ranks the advertising information based on time difference information between advertising information transmission time when the advertising information is transmitted to the communication terminal and the terminal location information transmission time, and on location difference information between the terminal location information and the transmission source location information, and
- provides said advertising information in association with said ranking information to the communication terminal.

* * * * *